United States Patent Office 2,724,708
Patented Nov. 22, 1955

2,724,708

FERROUS AND AMINE ADDITION TO BUTADIENE AND ACRYLONITRILE POLYMERIZATION

Harry Leverne Williams, Sarnia, Ontario, Canada, and James William Lynn Fordham, Hazardville, Conn., assignors to Polymer Corporation Limited, Sarnia, Ontario, Canada, a corporation of Canada No Drawing. Application February 9, 1953, Serial No. 335,984

Claims priority, application Canada July 12, 1952

4 Claims. (Cl. 260—82.5)

This invention relates to improvements in the emulsion polymerization of butadiene 1,3 and acrylonitrile. More particularly it relates to the addition of ferrous iron to a polymerization mixture comprising butadiene and acrylonitrile polymers, a persulfate catalyst and a cyanoethylated amine of the type described hereafter which may be normally present in the reaction mixture, as is sometimes the case with beta-dimethylaminopropionitrile or which may be artificially added in the manner disclosed in our copending application 311,322.

Butadiene-acrylonitrile reactions are conventionally carried out at temperatures of 85° F. and higher. Generally the recipe involves 100 parts of monomer, about 200 parts of aqueous solution containing approximately 2% emulsifier, 0.3 part of a persulfate catalyst and 0.7 part of a modifier. All parts are by weight. A wide range of variations is employed in the recipe to influence the properties of the product, but these are not significant for the present purposes. While monomer ratios may be varied through an appreciable range, a 64:36 butadiene-acrylonitrile ratio may be said to be representative.

In our copending application 311,322 we disclosed the invention that uniformly good yields may be obtained by insuring the presence within the reaction mixture of a substance selected from a group of cyanoethylated amines. In accordance with the present invention we have discovered that in some cases a further improvement in conversion can be obtained by the use of a small quantity of ferrous iron in addition to the cyanoethylated amine which may be normally present or added in accordance with our copending application 311,322. The activators, the effect of which we have shown to be enhanced by the addition of ferrous iron, comprise the cyanoethylated derivatives of ethylamine, dimethylamine, diethylamine, di-iso-propylamine, diethylenetriamine, ethanolamine, methylethanolamine, ethylethanolamine and morpholine. However, it will be noted that the optimum quantity of ferrous irons is highly critical and we believe that if the proper quantity of ferrous iron is ascertained in each case by non-inventive experimentation that it will be found that the effect of the amine activator is enhanced in each case.

The present invention has a particular application to increasing the conversion of monomers to polymers at a low reaction temperature of between 32° F. and about 60° F. and particularly at a reaction temperature of about 65° F.

It will be observed from Example 1 that with an arbitrarily selected addition to 100 parts of monomers of 1 millimole of various cyanoethylated amines and 0.1 millimole of ferrous iron the conversion was increased where the amines were of ethylamine, dimethylamine, diethylamine, diethylenetriamine, ethanolamine, methylethanolamine, ethylethanolamine and morpholine. Example 2 shows the results of varying the quantity of ferrous iron used with 1 millimole of beta-dimethylaminopropionitrile. It will be apparent that the useful range is between about 0.01 and 0.5 millimole, and that there is an optimum conversion at about 0.4 millimole.

EXAMPLE 1

Various charges were prepared and reacted for 17 hours at 55° F. In each case the charge confirmed with the following general recipe:

|  | Samples A and B | Samples C and D |
|---|---|---|
| Butadiene | 64 parts | 64 parts. |
| Acrylonitrile (low in natural activator) | 36 parts | 36 parts. |
| Water | 250 parts | 250 parts. |
| Emulsifier (mixed alkyl aryl sulfonate and condensed naphthalene sulfonate) | 3.6 parts | 3.6 parts. |
| Potassium hydroxide | 0.1 part | 0.1 part. |
| Mixed tertiary mercaptans | 0.5 part | 0.5 part. |
| Potassium persulfate | 0.27 part | 0.27 part. |
| Amine (as cyanoethylated derivative) | 1 millimole | 1 millimole. |
| $FeSO_4 \cdot 7H_2O$ | 0 | 0.0278 part (0.1 millimole). |

The results obtained are reproduced in Table I.

Table 1

| Amine | Samples | | | |
|---|---|---|---|---|
|  | A | B | C | D |
| No amine | 4.3 | 6.0 | 3.2 | 4.5 |
| Ammonia | 6.0 | 6.9 | 6.2 | 6.7 |
| Hydrazine | 12.8 | 15.8 | 11.5 | 13.1 |
| Hydroxylamine | 0.0 | 0.0 | 0.0 | 0.0 |
| Methylamine | 55.0 | 63.3 | 56.4 | 59.2 |
| Ethylamine | 30.6 | 30.9 | 34.0 | 36.0 |
| n-Propylamine | 11.2 | 16.4 | 8.7 | 9.3 |
| iso-Propylamine | 15.7 | 17.6 | 8.2 | 8.4 |
| n-Butylamine | 7.9 | 8.2 | 7.1 | 7.6 |
| sec.-Butylamine | 6.1 | 6.1 | 4.7 | 4.7 |
| Dimethylamine | 30.3 | 32.8 | 44.2 | 49.2 |
| Diethylamine | 28.0 | 28.6 | 31.8 | 34.0 |
| Di-n-propylamine | 6.5 | 12.5 | 7.4 | 10.1 |
| Di-iso-propylamine | 5.8 | 6.7 | 9.7 | 10.2 |
| Di-n-butylamine | 3.4 | 4.1 | 6.1 | 6.5 |
| Di-sec.-butylamine | 8.2 | 11.5 | 12.2 | 13.4 |
| di-n-hexylamine | 8.2 | 8.8 | 6.4 | 8.4 |
| Ethylenediamine | 22.5 | 22.6 | 18.1 | 20.7 |
| 1,2-Diaminopropane | 16.6 | 17.8 | 22.7 | 23.4 |
| Diethylenetriamine | 47.0 | 47.1 | 62.5 | |
| Triethylenetetramine | 35.9 | 36.9 | 33.1 | 34.0 |
| Tetraethylenepentamine | 10.2 | 25.3 | 24.6 | 26.8 |
| Polyethyleneamine 1000 | 13.1 | 14.4 | 14.2 | 14.6 |
| Ethanolamine | 19.0 | 25.7 | 34.75 | |
| Diethanolamine | 61.1 | 61.3 | 61.1 | 61.1 |
| Di-iso-propanolamine | 27.8 | 29.4 | 27.0 | 31.2 |
| Methylethanolamine | 74.9 | 76.6 | 82.7 | |
| Ethylethanolamine | 65.5 | 66.5 | 68.0 | 70.5 |
| 2-Aminoethylethanolamine | 31.8 | 33.3 | 29.2 | 29.3 |
| Phenylethanolamine | 1.9 | 1.9 | 1.1 | 1.1 |
| Cyclohexylamine | 9.0 | 11.7 | 7.8 | 8.3 |
| Piperidine | 13.0 | 15.2 | 10.3 | 10.6 |
| Morpholine | 27.5 | 29.0 | 34.3 | 35.1 |
| Aminoethylmorpholine | 40.6 | 43.4 | 36.5 | 37.2 |

The above results indicate that ferrous iron itself has no effect on the persulfate catalyst in the absence of an activator such as the cyanoethylated amines and in the presence of many such amines. The results which have been obtained indicate that if the optimum quantity of ferrous iron is used there will be an increase in the conversion of monomers to polymers where there is present an activator of the group comprising short chain alkyl and dialkyl amines and diethylenetriamine with short chain alkyl substituents. Since the more complex amines have residual amino groups they no doubt form higher derivatives in the presence of the acrylonitrile in the recipe and hence the final structure of the propionitrile present is in doubt. It is believed that their behaviour may approximate that of a series of dialkylamines joined together.

Example 2 shows the use of varying quantities of ferrous iron.

EXAMPLE 2

The same recipe as in samples A and B of Example 1 was employed, and various quantities of ferrous iron were added in the form of $FeSO_4 \cdot 7H_2O$. In each case one millimole of cyanoethylated dimethylamine was present in the form of beta-dimethylaminopropionitrile.

Table II

| Parts by weight $FeSO_4 \cdot 7H_2O$ | Millimoles $FeSO_4 \cdot 7H_2O$ | Percent Conversion in 17 hours | |
|---|---|---|---|
| | | A | B |
| 0 | 0 | 30.3 | 32.8 |
| .00278 | .01 | 32.2 | 32.8 |
| .00695 | .025 | 42.0 | 42.6 |
| .0139 | .05 | 46.7 | 46.8 |
| .0278 | .1 | 44.2 | 49.2 |
| .0555 | .2 | 56.4 | 60.1 |
| .0835 | .3 | 59.3 | 59.6 |
| .111 | .4 | 78.4 | — |
| .139 | .425 | 66.2 | 66.7 |
| .167 | .450 | 40.5 | 42.3 |
| .222 | .8 | 2.2 | 2.6 |
| .278 | 1.0 | 0.4 | 0.8 |

Table II reveals that the addition of the proper quantity of ferrous iron is very critical and that ferrous iron in lesser or greater quantities is not productive of optimal results.

Table III reproduced below shows the influence of iron concentration upon the conversion with various cyanoethylated amines. It will be apparent that in each case the proper concentration of iron is important and should lie between 0.3 and 0.5 millimole.

It is of interest that the equimolecular mixture of cyanoethylated dipropylamine and methylethanolamine gives unexpectedly high conversion.

The experimental procedure was the same as that adopted in connection with Table I and involved a reaction for 17 hours at 55° F.

Table III

| $FeSO_4 \cdot 7H_2O$ in millimoles per 100 parts of monomers | 0.0 | 0.1 | 0.3 | 0.4 | 0.5 | 0.6 | 0.8 |
|---|---|---|---|---|---|---|---|
| Monocyanoethylated methylethanolamine | 76.6 | 82.7 | 92.4 | 91.6 | 90.5 | 91.9 | 51.9 |
| Monocyanoethylated triethanolamine | | 71.9 | 86.0 | 88.3 | 85.0 | 70.2 | 59.0 |
| Monocyanoethylated diethanolamine | 61.3 | 61.8 | 83.0 | 84.3 | 84.8 | 72.3 | 34.3 |
| Monocyanoethylated ethanolamine | 25.7 | 34.75 | 54.85 | 57.3 | 50.1 | 42.9 | 28.9 |
| Monocyanoethylated diethylenetriamine | 47.1 | 62.5 | 71.25 | 74.6 | 68.2 | 48.7 | 24.7 |
| Monocyanoethylated triethylenetetramine | 36.9 | 34.8 | 35.1 | 32.8 | 27.8 | 26.1 | 24.4 |
| Monocyanoethylated tetraethylene pentamine | 25.3 | 25.7 | 26.3 | 24.5 | 21.0 | 20.8 | 19.8 |
| Monocyanoethylated diethylamine | 28.6 | 32.3 | 55.7 | 64.1 | 62.5 | 58.0 | 52.4 |
| Monocyanoethylated dipropylamine | 6.7 | 8.3 | 23.6 | 32.3 | 38.3 | 34.7 | 27.2 |
| Dicyanoethylated triethanolamine | | 57.3 | 75.6 | 77.8 | 76.7 | 66.8 | 51.4 |
| Equimolecular mixture of dipropyl and methylethanolamines (monocyanoethylated) | | 55.7 | 77.6 | 83.2 | 83.0 | 74.1 | 33.7 |

We claim:

1. A process for the low temperature emulsion polymerization of butadiene and acrylonitrile with a water soluble persulphate catalyst in the presence of an activator comprising about one millimole of cyanoethylated methylethanolamine, in which about 0.3 to 0.5 millimole of ferrous iron for each hundred parts of monomers are added prior to polymerization.

2. A process as in claim 1 in which the catalyst is potassium persulphate.

3. A process as in claim 1 in which the polymerization is carried out at a temperature of about 55° F.

4. A process as in claim 1 in which the ferrous iron is added in the form of ferrous sulphate.

References Cited in the file of this patent

UNITED STATES PATENTS

| 2,451,180 | Stewart | Oct. 12, 1948 |
| 2,529,315 | Serniuk | Nov. 7, 1950 |